(12) United States Patent
Zhou et al.

(10) Patent No.: US 8,739,831 B2
(45) Date of Patent: Jun. 3, 2014

(54) SELF-RESET VALVE

(75) Inventors: Huasong Zhou, Xiamen (CN); Yanhui Zhong, Xiamen (CN); Haisong Peng, Xiamen (CN); Qingshuang Li, Xiamen (CN)

(73) Assignees: Xiamen Solex High-Tech Industries Co., Ltd., Xiamen (CN); Huasong Zhou, Xiamen (CN)

( * ) Notice: Subject to any disclaimer, the term of this patent is extended or adjusted under 35 U.S.C. 154(b) by 63 days.

(21) Appl. No.: 13/698,007

(22) PCT Filed: May 9, 2011

(86) PCT No.: PCT/CN2011/073808
§ 371 (c)(1),
(2), (4) Date: Nov. 14, 2012

(87) PCT Pub. No.: WO2011/140959
PCT Pub. Date: Nov. 17, 2011

(65) Prior Publication Data
US 2013/0056095 A1    Mar. 7, 2013

(30) Foreign Application Priority Data

May 14, 2010 (CN) .......................... 2010 1 0172781
May 14, 2010 (CN) .......................... 2010 2 0191172

(51) Int. Cl.
*F16K 11/074* (2006.01)
(52) U.S. Cl.
USPC .................. 137/625.11; 134/625.47; 251/230
(58) Field of Classification Search
USPC ............ 137/625.11, 625.12, 625.13, 625.14, 137/625.15, 625.47, 876, 630.16; 251/230
See application file for complete search history.

(56) References Cited

U.S. PATENT DOCUMENTS

| | | | | | |
|---|---|---|---|---|---|
| 2,209,132 | A | * | 7/1940 | Parker | 137/625.11 |
| 2,209,134 | A | * | 7/1940 | Parker | 137/625.11 |
| 3,450,383 | A | * | 6/1969 | Leverett et al. | 251/165 |
| 3,687,163 | A | * | 8/1972 | Nickels | 137/625.11 |
| 3,837,360 | A | * | 9/1974 | Bubula | 137/625.46 |
| 4,427,177 | A | * | 1/1984 | Constantinescu et al. | 251/230 |
| 4,653,534 | A | | 3/1987 | Chung-Shan | |

FOREIGN PATENT DOCUMENTS

| | | |
|---|---|---|
| CN | 2573806 Y | 9/2003 |
| CN | 2656750 Y | 11/2004 |
| CN | 200989472 Y | 12/2007 |
| CN | 201003633 Y | 1/2008 |
| CN | 101799082 A | 8/2010 |
| CN | 201651411 U | 11/2010 |

(Continued)

*Primary Examiner* — Stephen M Hepperle
*Assistant Examiner* — Umashankar Venkatesan
(74) *Attorney, Agent, or Firm* — Rabin & Berdo, P.C.

(57) ABSTRACT

A self-reset valve has a fixed unit, a water diversion body, a stop mechanism, a drive shaft and a clutch. The fixed unit is disposed with an inlet waterway and at least two waterways. The water diversion body is rotatably connected to the fixed unit inside. The water diversion body is disposed with an outer revolution surface having an outer ratch and an inner revolution surface. The stop mechanism is connected to the fixed unit and acted on the outer ratch. The drive shaft is rotatably connected to the fixed unit. The drive shaft is disposed with a control end and a drive end. The clutch is connected between the drive end of the drive shaft and the inner revolution surface of the water diversion body. The reset elastic body is connected between the drive shaft and the fixed unit.

18 Claims, 8 Drawing Sheets

(56) References Cited

FOREIGN PATENT DOCUMENTS

| | | |
|---|---|---|
| DE | 102007026828 A1 | 12/2008 |
| JP | 50012196 U | 2/1975 |
| JP | 10252907 A | 9/1998 |
| KR | 20080004187 U | 9/2008 |
| WO | WO-9813632 A1 | 4/1998 |

* cited by examiner

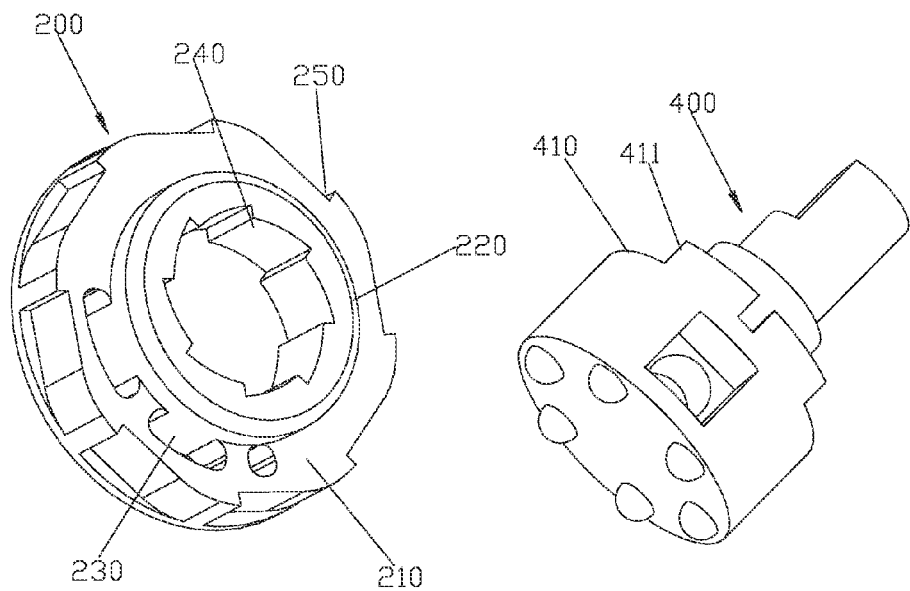
FIG. 5
FIG. 6
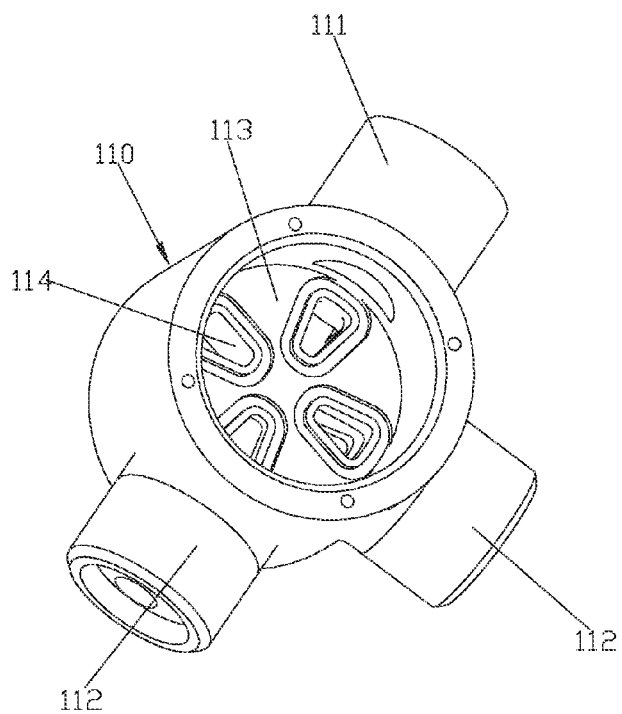
FIG. 7

SELF-RESET VALVE

FIELD OF THE INVENTION

The present invention relates to a self-reset valve.

BACKGROUND OF THE INVENTION

The existing rotary valve includes a fixed unit, a water diversion body, a drive shaft and a rocker. The fixed unit has an inlet waterway and at least tow outlet waterways. The water diversion body is rotatably connected to the fixed unit inside, and the switch of the outlet waterways to connect to the inlet waterway is realized by the relative rotary of the water diversion body and the fixed unit. The drive shaft is disposed with a fixed end and a control end, the fixed end is fixed to the water diversion body, while the control end is extended out of the fixed unit to be fixed to the rocker. The existing rotary valve has disadvantages as below: firstly, as the drive shaft and the rocker can not self-reset, they are positioned in different place in different status, which is not convenient for the user's operation; secondly, as the water diversion body, the drive shaft and the rocker are fixed together, whether the rotary of the water diversion body is positioned accurately is controlled by the rocker, it may be over rotated or not rotated enough. It's unable guarantee the reliability of switch.

SUMMARY OF THE INVENTION

The present invention is provided with a self-reset valve, which overcomes the disadvantages of the existing rotary valve.

The technical proposal of the present invention to resolve the technical problems is as below:

A self-reset valve includes:

A fixed unit, which is disposed with an inlet waterway and at least two outlet waterways;

A water diversion body, which is rotatably connected to the fixed unit inside, the switch of the outlet waterways to connect to the inlet waterway is realized by the relative rotary of the water diversion body and the fixed unit; the water diversion body is disposed with an outer revolution surface and an inner revolution surface, the outer revolution surface is disposed with outer ratch;

A stop mechanism, which is connected to the fixed unit and acted on the outer ratch, the stop mechanism is used to prevent reversal of the water diversion body;

A drive shaft, which is rotatably connected to the fixed unit, the drive shaft is disposed with a control end and a drive end, the control end is placed outside the fixed unit for the user's operation, the drive end is disposed inside the fixed unit;

A clutch, which is connected between the drive end of the drive shaft and the inner revolution surface of the water diversion body, the clutch is engaged when the drive shaft rotates forward, the clutch is disengaged when the drive shaft rotates backward; and A reset elastic body, which is connected between the drive shaft and the fixed unit to make the drive shaft reverse and reset.

In another preferred embodiment, the clutch includes an inner ratch disposed in the inner revolution surface of the water diversion body, an assembly groove concaved in the drive end of the drive shaft, an elastic body disposed inside the assembly groove and a play block withstood by the elastic body and extended outside the drive end, the play block is coupled to the inner ratch.

In another preferred embodiment, the assembly groove is a radial throughout groove, the number of the play block is two, and the two play blocks are sliding and connected to the assembly groove and separately connected to the two ends of the elastic body.

In another preferred embodiment, the present invention further includes a rocker, the rocker is fixed to the control end of the drive shaft.

In another preferred embodiment, the water diversion body includes a plate and a perispore fixed on the plate, the inner revolution surface of the perispore is disposed with inner ratch, the outer revolution surface of the plate is disposed with outer ratch; the plate is disposed with outlet hole, which is disposed outside the perispore.

In another preferred embodiment, the fixed unit includes:

A main body, which is tubular and with inner hole, a division board is disposed inside the inner hole, the division board is disposed with water diversion holes, the water diversion holes are connected to the outlet waterways one to one correspondence;

An upper cover, which is sealed and fixed to the upper port of the main body, making the space between the division board and the upper cover forming an outlet cavity, the outlet cavity is connected to the inlet waterway; and A lower cover, which is sealed and connected to the lower port of the main body.

In another preferred embodiment, the bottom surface of the plate of the water diversion body is sealed and rotatably connected to the top surface of the division board; the switch of the water diversion holes to connect to the outlet holes is realized by the relative rotary of the water diversion body and the division board.

In another preferred embodiment, the side surface of the main body is disposed with an inlet and two outlets; the inlet is coupled to the inlet waterway, while the two outlets are separately coupled to the two outlet waterways.

In another preferred embodiment, the number of the outlet waterways is two, the number of the water diversion holes is two sets, each set of the water diversion holes includes two water diversion holes of symmetry; the outlet area of the outlet hole is larger than the distance between two neighbor water diversion holes.

In another preferred embodiment, the reset elastic body is a torsion spring, which is disposed between the drive shaft and the upper cover. Compared to the existing technology, the present invention has advantages below:

1. With the stop mechanism, the clutch and the reset elastic body, the drive shaft rotates forward and drives the clutch rotate forward by the clutch, making sure that the water diversion body stays still when the drive shaft rotates backward and resets. So it can be self-reset and the drive shaft is positioned in the same position despite the state of the shower. it's convenient for the user's operation. The rotary angle is determinate by the ratch, making the switch accurately.

2. The clutch includes inner ratch, assembly groove, elastic body and play block, the play block works on the inner ratch by the withstanding of the elastic body, the switch is energy saving with minimized operation force.

3. The two play blocks are separately connected to the two ends of the elastic body, it's convenient to assemble and the clutch is stably and reliably.

4. The rocker is fixed to the control end of the drive shaft, which is convenient for the user's operation.

5. The water diversion body includes a plate and a perispore, the inner revolution surface of the perispore is disposed with inner ratch, the outer revolution surface of the plate is disposed with outer ratch, it can be easily machined to couple to the clutch and stop mechanism.
6. The area of the outlet hole is bigger than the distance between the two neighbor water diversion holes, making it with three outlet status: first one is a first outlet waterway, second one is a second outlet waterway, third one is the first outlet waterway and the second waterway.

BRIEF DESCRIPTION OF THE DRAWINGS

The present invention is further described with the drawings and the embodiments.

FIG. 5 illustrates the structure of the water diversion body of the self-reset valve of the preferred embodiment of the present invention;

FIG. 6 illustrates the structure of the drive shaft of the self-reset valve of the preferred embodiment of the present invention;

FIG. 7 illustrates the structure of the main body of the self-reset valve of the preferred embodiment of the present invention;

FIG. 8 illustrates the second vertical sectional cross view of the self-reset valve of the preferred embodiment of the present invention when the first outlet waterway is switched on;

FIG. 9 illustrates the lateral sectional cross view of the self-reset valve of the preferred embodiment of the present invention when the first outlet waterway is switched on;

FIG. 10 illustrates the second vertical sectional cross view of the self-reset valve of the preferred embodiment of the present invention when the second outlet waterway is switched on;

FIG. 11 illustrates the lateral sectional cross view of the self-reset valve of the preferred embodiment of the present invention when the second outlet waterway is switched on;

FIG. 12 illustrates the lateral sectional cross view of the self-reset valve of the preferred embodiment of the present invention when the first and the second outlet waterway are switched on;

DETAILED DESCRIPTION OF THE EMBODIMENTS

Figure 1:
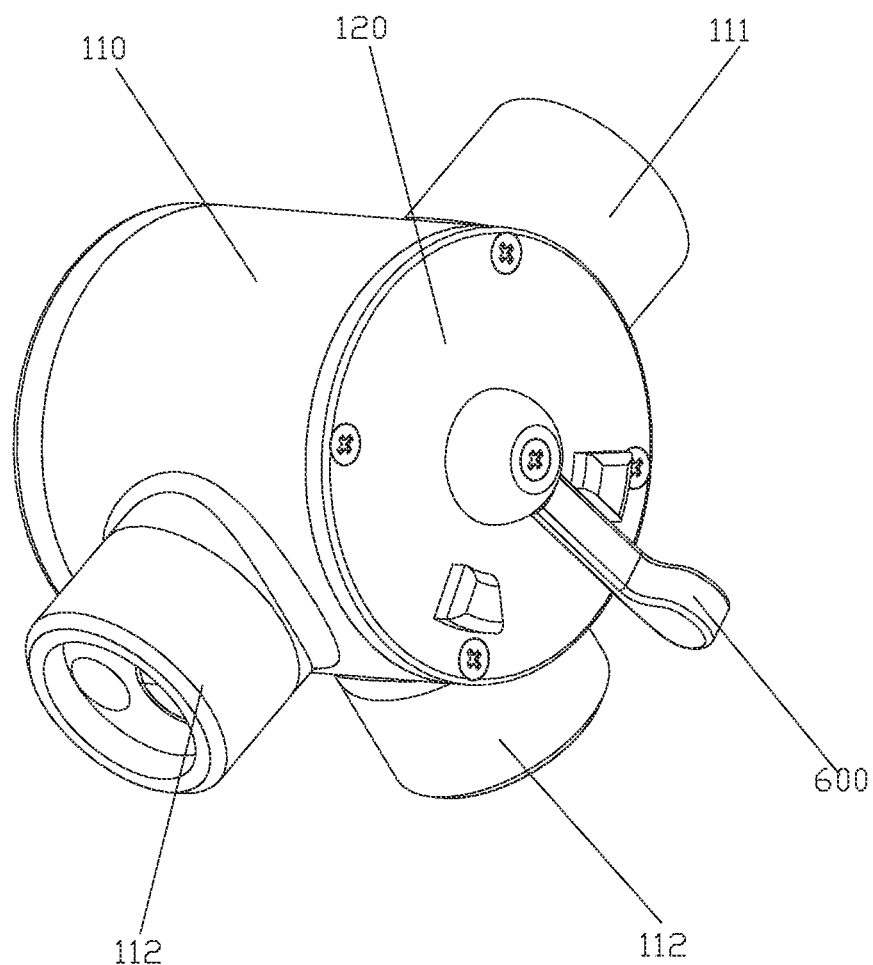
FIG. 1 illustrates the structure of the self-reset valve of the preferred embodiment of the present invention.
Figure 12:
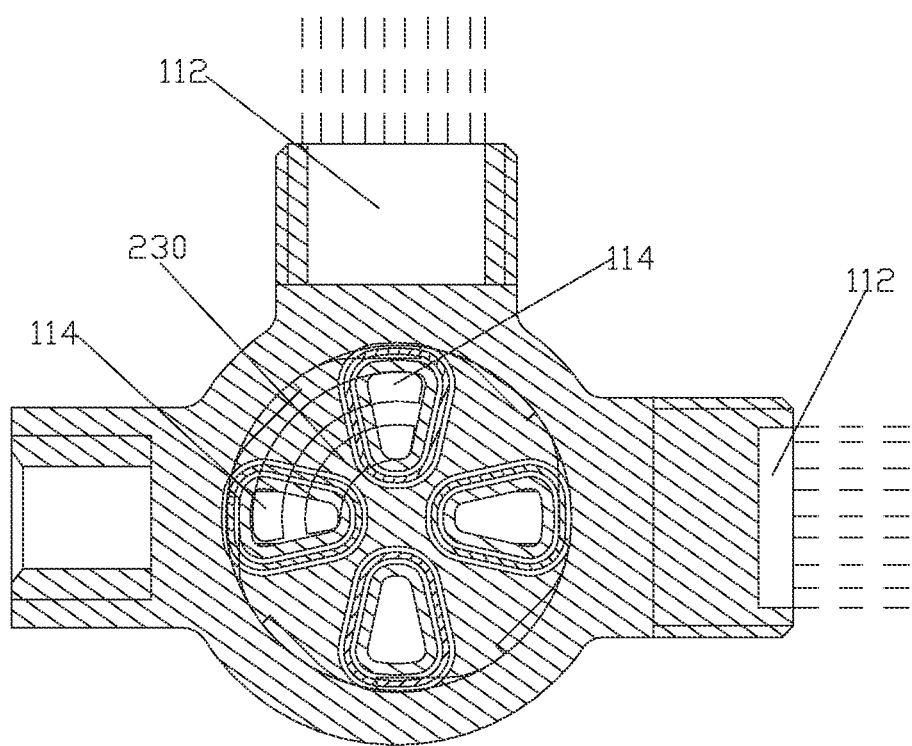

Please refer to the FIG. 1 to the FIG. 12; a self-reset valve includes a fixed unit 100, a water diversion body 200, a stop mechanism 300, a drive shaft 400, a clutch, a reset elastic body 500 and a rocker 600.

Figure 2:
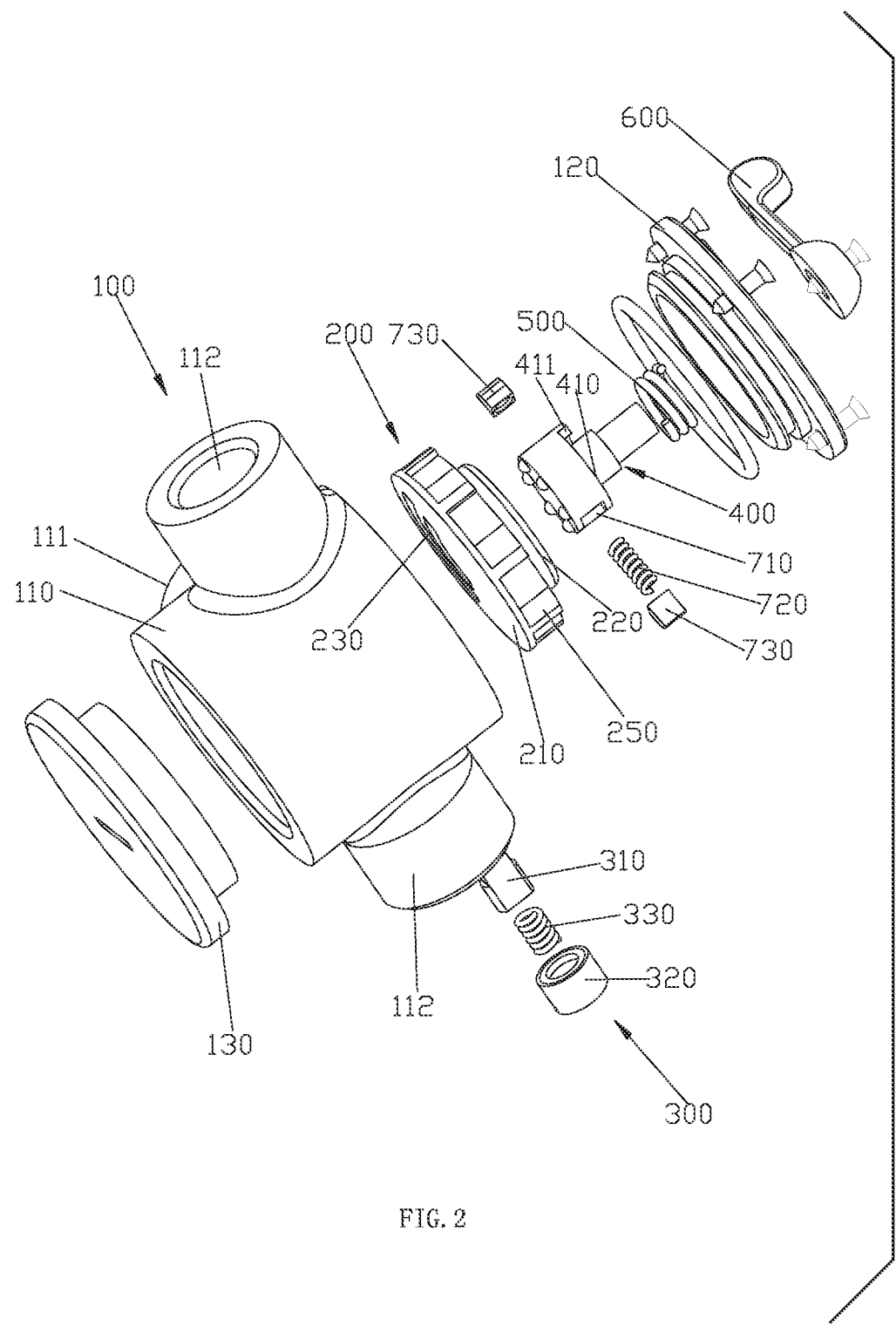
FIG. 2 illustrates the breakdown structure of the self-reset valve of the preferred embodiment of the present invention.
Figure 3:
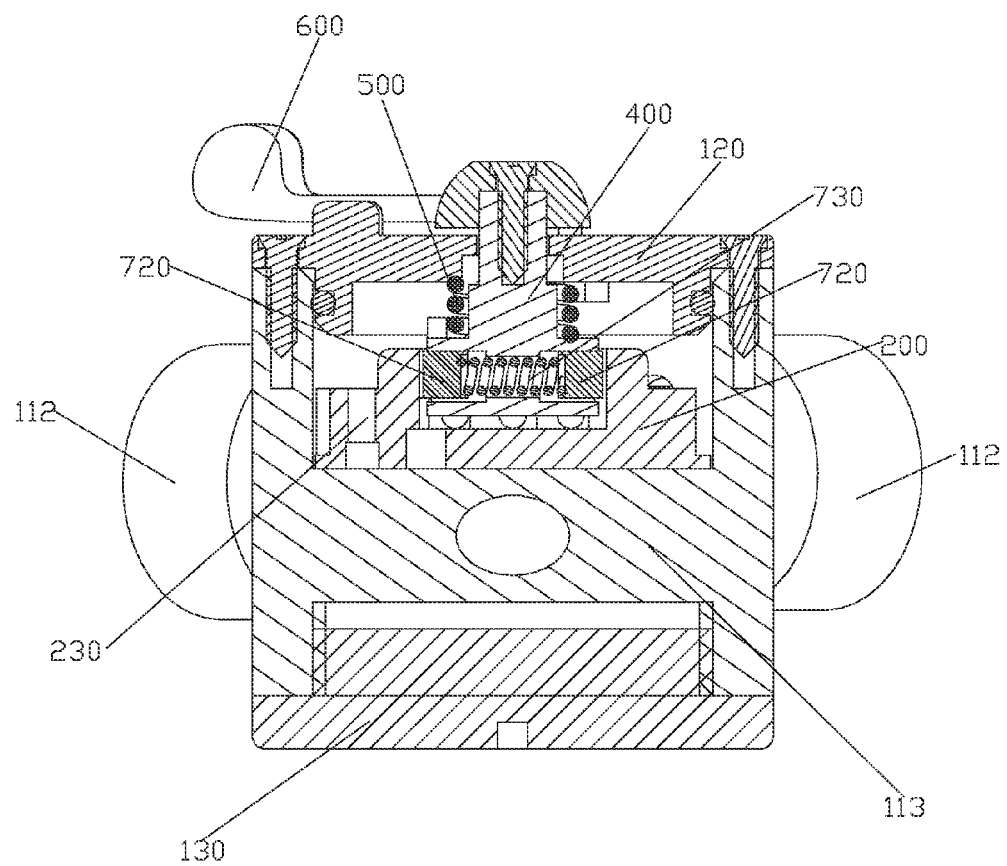
FIG. 3 illustrates the first vertical sectional cross view of the self-reset valve of the preferred embodiment of the present invention.

Please refer to the FIG. 1 to FIG. 2, especially the FIG. 2, FIG. 3 and FIG. 7. The fixed unit 100 includes a main body 110, an upper cover 120 and a lower cover 130.

The main body 110 is tubular shaped and disposed with an inlet hole 111 and two outlet holes 112. The inlet 110 is connected to the water source, while the two outlet holes 112 are separately connected to two outlet functions; the main body 110 has an inner hole, which is disposed with a division board 113. The division board 113 is disposed with water diversion holes 114 of same set number with the outlet holes 112. the water diversion holes 114 are separately connected to the outlet holes one to one correspondence. In this embodiment, each set of water diversion holes 114 includes two water diversion holes of radially symmetry. The main body 110 is disposed with a sliding groove 115 of throughout in the inner hole; the inner port of the sliding groove 115 is placed above the division board 113.

The upper cover 120 is sealed and fixed to the upper port of the inner hole of the main body 110, and the inner port of the inlet hole 111 is disposed between the division board 113 and the upper cover 120, making the space between the division board 113 and the upper cover forming an outlet cavity. The outlet cavity is connected to the inlet hole 111. in this embodiment, the space between the water diversion hole 114 and the outlet hole 112 can be considered as the outlet waterway, while the inlet hole 111 to be the inlet waterway. Or the space between the inlet hole 111 and the outlet hole 230 can be considered to be the inlet waterway.

The lower cover is sealed and fixed to the lower port of the main body.

Please refer to the FIG. 1 to the FIG. 12, especially the FIG. 5. the water diversion body 200 includes a plate 210 and a perispore 220 fixed on the plate 210, the inner revolution surface of the perispore 220 is disposed with inner ratch 240, the outer revolution surface of the plate 210 is disposed with outer ratch 250; the plate 210 is disposed with a set of outlet holes 230, which are disposed outside the perispore 220. Please refer to the FIG. 1 to the FIG. 12, especially the FIG. 8 to the FIG. 12. the water diversion body 200 is rotatably connected to the main body 110 inside, the bottom surface of the plate 210 of the water diversion body is sealed and ratotably connected to the top surface of the division board 110. The switch of the water diversion holes 114 to connect to the outlet holes 230 is realized by the relative rotary of the water diversion body 200 and the division board 113. Moreover, the outer ratch 250 is coupled to the inner port of the sliding groove 115 of the main body 110.

Figure 4:
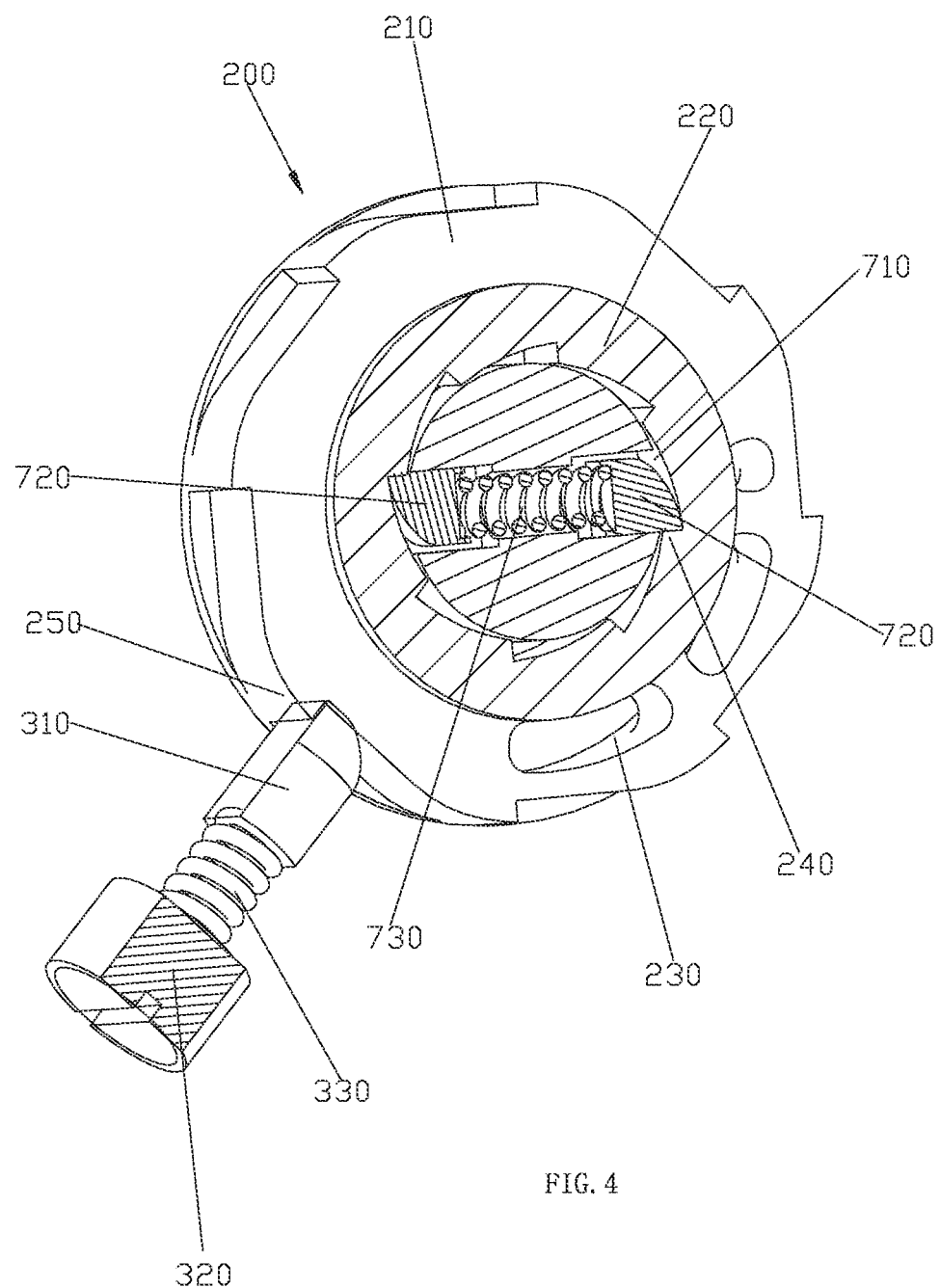
FIG. 4 illustrates the sectional view of the machine theory of the self-reset valve of the preferred embodiment of the present invention.
Figure 8:
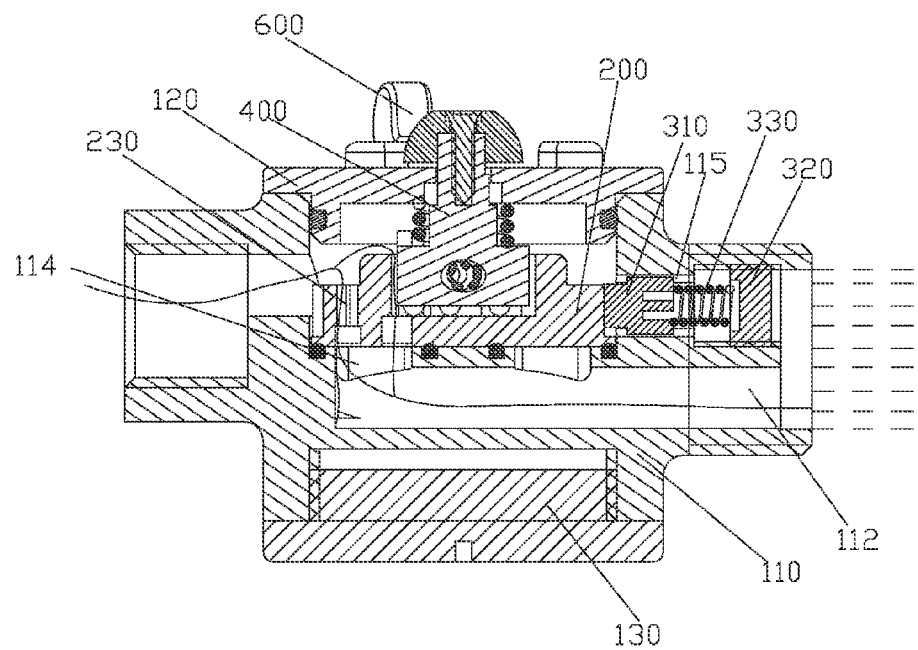

Please refer to the FIG. 1 to the FIG. 12, especially the FIG. 2, the FIG. 4 and the FIG. 8. the stop mechanism includes a position pin 310 radially sliding connected to the sliding groove 115 of the main body 100, a plug 320 locked and connected to the outer port of the sliding groove 115 of the main body 110 and a spring 330 withstood between the position pin 310 and the plug 320. with the act of the spring 320, the position pin 310 works on the outer ratch 250 of the water diversion body 200 to make the water diversion body 200 rotate forward and unable to rotate backward.

Please refer to the FIG. 1 to the FIG. 12, especially the FIG. 2, FIG. 4 and FIG. 6. The drive shaft 400 is ratotably connected to the fixed unit 100. It rotates and runs through the upper cover 120. The drive shaft 400 has a control end and a drive end, the control end is positioned on the upper cover 120, while the drive end is positioned below the upper cover 120.

Please refer to the FIG. 1 to the FIG. 12. The rocker 600 is fixed to the control end of the drive shaft 400 and it drives the drive shaft 400 rotate.

Please refer to the FIG. 1 to the FIG. 12, especially the FIG. 2, FIG. 4 and FIG. 6. The clutch is connected between the drive end of the drive shaft 400 and the inner revolution surface of the water diversion body 200, the clutch is engaged when the drive shaft 400 rotates forward, the clutch is disengaged when the drive shaft 400 rotates backward. The clutch includes a assembly groove 710 of throughout and concaved in the drive end of the drive shaft 400, an elastic body 720 disposed inside the assembly groove 710 and two play blocks 730, the two play blocks 730 are sliding and connected to the assembly groove 710, separately connected to the two ends of the elastic body 720 and withstood by the elastic body 720 and extended out of the drive end. The play blocks 730 are coupled to the inner ratch 240 of the water diversion body 200.

Figure 10:
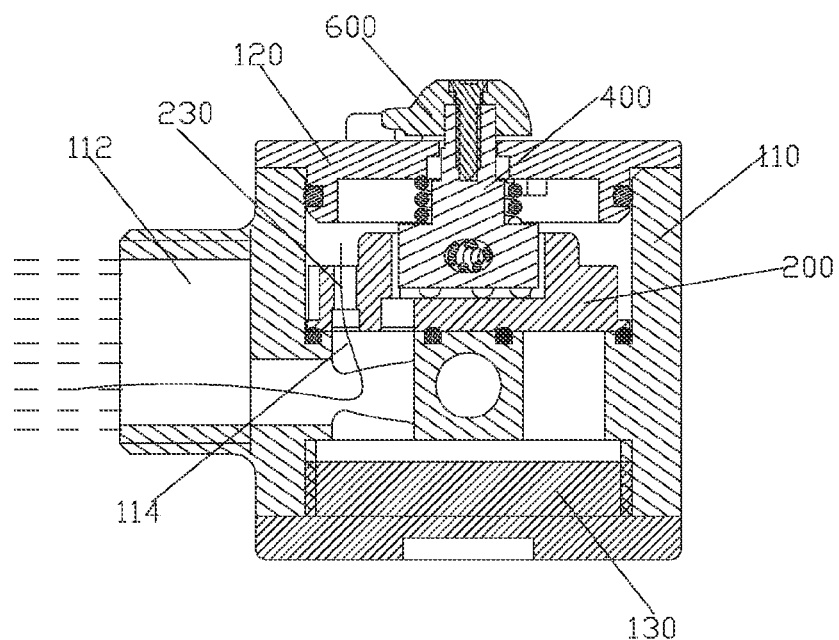

Please refer to the FIG. 1 to the FIG. 12, especially the FIG. 3, FIG. 8 and FIG. 10. the reset elastic body 500 is torsion spring. Preferably, the drive shaft 400 is a step rod of big lower and small upper. One end of the torsion spring 500 is withstood the step surface 410 of the step rod, while the other end connected to the upper cover 120, making that the torsion spring 500 generates torsion force to make the drive shaft 400 rotate backward and reset, but also generates an elastic force downward on the drive shaft 400, the drive shaft 400 drives the elastic force on the water diversion body 200, making the bottom surface of the water diversion body 200 and the main body 110 contact together. The sealing performance is then realized. Preferably, the step surface is convex and disposed with a step 411 withstood one end of the torsion spring 500. As required, the bottom surface of the drive shaft is disposed with bossed to reduce the contact area and the friction force.

Figure 9:
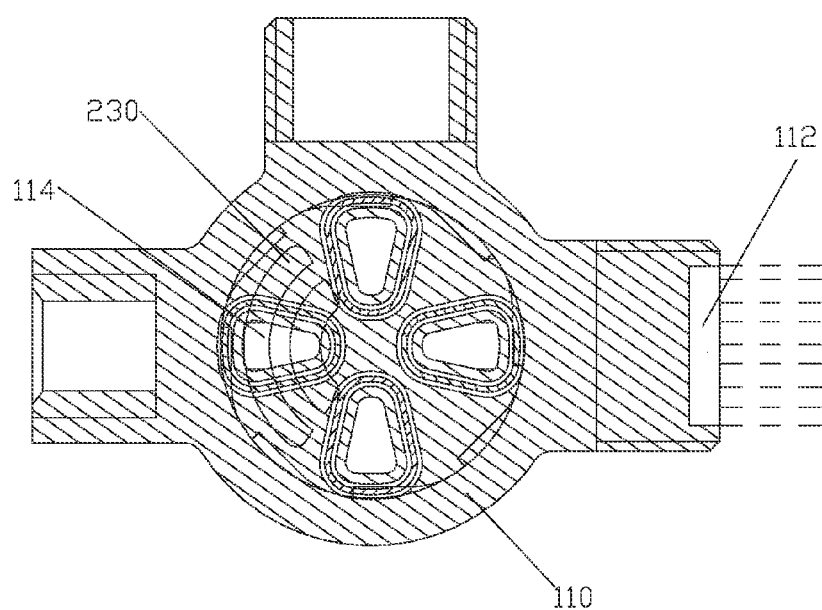

Please refer to the FIG. 9 and FIG. 12. in this embodiment, the area of the outlet hole 230 of the water diversion body 200 is bigger than the distance between the two neighbor water diversion holes 114 of the division board 113 but smaller than the sum area of the two neighbor distance and a water diversion hole, making it with three outlet status: first one is a first outlet waterway, second one is a second outlet waterway, third one is a first outlet waterway and a second waterway.

For the examiner further understand the present invention, the switch principle and the reset principle of the reset valve will be detailed described.

Assume in the initial state, the water diversion body 200 is positioned in the first position, refer to the FIG. 8 and FIG. 9, the outlet hole 230 of the water diversion body 200 aligns to the first set of the water diversion hole of the division board 113, the water flows out of the first outlet waterways.

Figure 11:
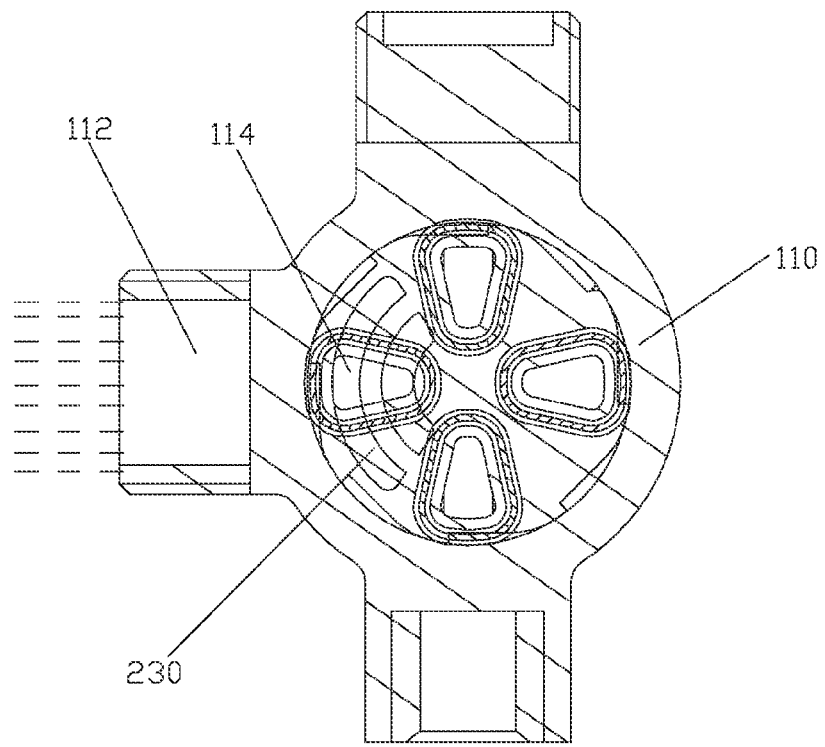

Rotate the rocker 600 forward to make the drive shaft 400 rotate forward, the clutch is disengaged, the drive shaft 400 drives the water diversion body rotate forward to reach to the third position, refer to the FIG. 10 and FIG. 11, the outlet hole 230 of the water diversion body 200 is connected to the second set of the water diversion holes of the division board 113. the water flows out of the second outlet waterway; release the rocker 600, with the effect of the torsion spring 500, the drive shaft 400 rotates backward and resets, the water diversion body 200 stays still with the effect of the stop mechanism without rotary backward, the clutch is disengaged.

From above description, it can be switched from the second outlet waterway to the first and second outlet waterways, or from the first and second outlet waterway to the first outlet waterway.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

Industrial Applicability

The present invention of a self-reset valve is provided with simple structure and reasonable design. The present invention can realize automatic reset, making sure that the drive shaft is positioned in the same position despite the state of the shower. It's convenient for the user's operation with well industrial applicability.

What is claimed is:

1. A self-reset valve, wherein includes:
    a fixed unit, which is disposed with an inlet waterway and at least two outlet waterways;
    a water diversion body, which is rotatably connected to the fixed unit inside, the switch of the outlet waterways to connect to the inlet waterway is realized by the relative rotary of the water diversion body and the fixed unit; the water diversion body is disposed with an outer revolution surface and an inner revolution surface, the outer revolution surface is disposed with an outer ratchet;
    a stop mechanism, which is connected to the fixed unit and acted on the outer ratchet, the stop mechanism is used to prevent reversal of the water diversion body;
    a drive shaft, which is rotatably connected to the fixed unit, the drive shaft is disposed with a control end and a drive end, the control end is placed outside the fixed unit for the user's operation, the drive end is disposed inside the fixed unit;
    a clutch, which is connected between the drive end of the drive shaft and the inner revolution surface of the water diversion body, the clutch is engaged when the drive shaft rotates forward, the clutch is disengaged when the drive shaft rotates backward; and
    a reset elastic body, which is connected between the drive shaft and the fixed unit to make the drive shaft reverse and reset.

2. A self-reset valve according to the claim 1, wherein the clutch includes an inner ratchet disposed in the inner revolution surface of the water diversion body, an assembly groove concaved in the drive end of the drive shaft, an elastic body disposed inside the assembly groove and a play block withstood by the elastic body and extended outside the drive end, the play block is coupled to the inner ratchet.

3. A self-reset valve according to the claim 2, wherein the assembly groove is a radial throughout groove, the number of the play block is two, the two play blocks are sliding and connected to the assembly groove and separately connected to the two ends of the elastic body.

4. A self-reset valve according to the claim 1, wherein further includes a rocker, the rocker is fixed to the control end of the drive shaft.

5. A self-reset valve according to the claim 1, wherein the water diversion body includes a plate and a raised step on the plate, the inner revolution surface of the raised step is disposed with an inner ratchet, the outer revolution surface of the plate is disposed with outer ratchet; the plate is disposed with an outlet hole, which is disposed outside the raised step.

6. A self-reset valve according to the claim 5, wherein the fixed unit includes:
    a main body, which is tubular and with an inner hole, a division board is disposed inside the inner hole, the division board is disposed with water diversion holes, the water diversion holes are connected to the outlet waterways one to one correspondence;
    an upper cover, which is sealed and fixed to the upper port of the main body, making the space between the division board and the upper cover forming an outlet cavity, the outlet cavity is connected to the inlet waterway; and
    a lower cover, which is sealed and connected to the lower port of the main body.

7. A self-reset valve according to the claim 6, wherein the bottom surface of the plate of the water diversion body is sealed and rotatably connected to the top surface of the division board, the switch of the water diversion holes to connect to the outlet holes is realized by the relative rotary movement of the water diversion body and the division board.

8. A self-reset valve according to the claim 6, wherein the side surface of the main body is disposed with an inlet and two outlets, the inlet is coupled to the inlet waterway, while the two outlets are separately coupled to the two outlet waterways.

9. A self-reset valve according to the claim 6, wherein the number of the outlet waterways is two, the number of the water diversion holes is two sets, each set of the water diversion holes includes two water diversion holes of symmetry; the outlet area of the outlet hole is larger than the distance between two adjacent water diversion holes.

10. A self-reset valve according to the claim 6, wherein the reset elastic body is a torsion spring, which is disposed between the drive shaft and the upper cover.

11. A self-reset valve according to the claim 2, wherein further includes a rocker, the rocker is fixed to the control end of the drive shaft.

12. A self-reset valve according to the claim 3, wherein further includes a rocker, the rocker is fixed to the control end of the drive shaft.

13. A self-reset valve according to the claim 2, wherein the water diversion body includes a plate and a raised step on the plate, the inner revolution surface of the raised step is disposed with the inner ratchet, the outer revolution surface of the plate is disposed with the outer ratchet; the plate is disposed with an outlet hole, which is disposed outside the raised step.

14. A self-reset valve according to the claim 13, wherein the fixed unit includes:
  a main body, which is tubular and with inner hole, a division board is disposed inside the inner hole, the division board is disposed with water diversion holes, the water diversion holes are connected to the outlet waterways one to one correspondence;
  an upper cover, which is sealed and fixed to the upper port of the main body, making the space between the division board and the upper cover forming an outlet cavity, the outlet cavity is connected to the inlet waterway; and
  a lower cover, which is sealed and connected to the lower port of the main body.

15. A self-reset valve according to the claim 14, wherein the bottom surface of the plate of the water diversion body is sealed and rotatably connected to the top surface of the division board, the switch of the water diversion holes to connect to the outlet holes is realized by the relative rotary movement of the water diversion body and the division board.

16. A self-reset valve according to the claim 14, wherein the side surface of the main body is disposed with an inlet and two outlets, the inlet is coupled to the inlet waterway, while the two outlets are separately coupled to the two outlet waterways.

17. A self-reset valve according to the claim 14, wherein the number of the outlet waterways is two, the number of the water diversion holes is two sets, each set of the water diversion holes includes two water diversion holes of symmetry; the outlet area of the outlet hole is larger than the distance between two adjacent water diversion holes.

18. A self-reset valve according to the claim 12, wherein the reset elastic body is a torsion spring, which is disposed between the drive shaft and the upper cover.

\* \* \* \* \*